United States Patent
Bothmann

(10) Patent No.: US 9,938,996 B2
(45) Date of Patent: Apr. 10, 2018

(54) CONTROL BUTTON RETENTION MECHANISM

(71) Applicant: Snap-on Incorporated, Kenosha, WI (US)

(72) Inventor: Richard D. Bothmann, Grayslake, IL (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/639,264

(22) Filed: Mar. 5, 2015

(65) Prior Publication Data

US 2016/0260556 A1    Sep. 8, 2016

(51) Int. Cl.
*H01H 13/06* (2006.01)
*F16B 2/20* (2006.01)
*G05G 1/02* (2006.01)

(52) U.S. Cl.
CPC ............... *F16B 2/20* (2013.01); *G05G 1/02* (2013.01); *H01H 13/06* (2013.01); *H01H 2221/03* (2013.01); *H01H 2221/058* (2013.01)

(58) Field of Classification Search
CPC .. H01H 13/06; H01H 2223/002; H01H 13/14; H01H 2221/044; H01H 2235/006; H01H 2235/02; H01H 27/00; H01H 3/122; H01H 13/20
USPC .......... 200/341–345, 302.1, 302.2, 314, 547, 200/530, 511
See application file for complete search history.

(56) References Cited

U.S. PATENT DOCUMENTS

| | | | |
|---|---|---|---|
| 3,973,099 A * | 8/1976 | Morris, Sr. ............ | G04C 3/001 200/302.2 |
| 3,974,351 A | 8/1976 | Solov et al. | |
| 4,755,645 A | 7/1988 | Naoki et al. | |
| 5,145,058 A | 9/1992 | Lee | |
| 5,308,943 A | 5/1994 | Screven et al. | |
| 5,907,612 A | 5/1999 | Aggus et al. | |
| 6,107,585 A * | 8/2000 | Gehr ...................... | H01H 3/122 200/341 |
| 7,045,732 B1 * | 5/2006 | Hsu ...................... | H01H 3/0226 200/334 |
| 8,381,830 B2 | 2/2013 | Puzio et al. | |

(Continued)

FOREIGN PATENT DOCUMENTS

| CN | 101115410 | 1/2008 |
|---|---|---|
| CN | 201498407 U | 6/2010 |

(Continued)

OTHER PUBLICATIONS

Australian Government Patent Examination Report No. 1, dated Mar. 11, 2016; 7 pages.

(Continued)

*Primary Examiner* — Ahmed Saeed
(74) *Attorney, Agent, or Firm* — Seyfarth Shaw LLP

(57) ABSTRACT

A button retention mechanism that removably retains a button within a device while allowing easy replacement of a depressible or switchable button. The mechanism includes a retention member coupled to the button on a first end and removably coupled to a body at an opposing second end through a snap-fit or interference-fit. Such a structure allows for insertion and removal of the button without disassembling the device, and provides structural stability of the button.

13 Claims, 5 Drawing Sheets

(56) References Cited

U.S. PATENT DOCUMENTS

| | | |
|---|---|---|
| 2008/0251269 A1 | 10/2008 | Hua |
| 2009/0057123 A1 | 3/2009 | Yoshikawa |
| 2010/0046163 A1 | 2/2010 | Yu et al. |
| 2011/0024271 A1 | 2/2011 | Zanini et al. |
| 2012/0044623 A1* | 2/2012 | Rivera .................. G06F 1/1626 361/679.02 |
| 2012/0266971 A1 | 10/2012 | Nourian |

FOREIGN PATENT DOCUMENTS

| | | |
|---|---|---|
| CN | 102476367 A | 5/2012 |
| CN | 203377143 U | 1/2014 |
| CN | 204144111 U | 2/2015 |
| DE | 3837636 A1 | 5/1990 |
| DE | 10157329 C1 | 3/2003 |
| EP | 2043119 A1 | 5/2013 |
| GB | 1218480 A | 1/1971 |
| GB | 2187891 B | 4/1989 |
| TW | 201009538 A | 3/2010 |
| TW | 201421464 A | 6/2014 |

OTHER PUBLICATIONS

China Patent Office, First Office Action dated Sep. 14, 2016; 12 pages.
UK Combined Search and Examination Report, dated Aug. 5, 2016; 7 pages.
UK Combined Search and Examination Report, dated Jun. 23, 2016; 8 pages.
Australian Government Patent Examination Report No. 1, dated May 30, 2016; 7 pages.
State Intellectual Property Office of P.R. China, The First Office Action, dated May 11, 2017; 9 pages.
Chinese Office Action for Application No. 201510876921.9 dated Aug. 2, 2017, 9 pages.

* cited by examiner

CONTROL BUTTON RETENTION MECHANISM

TECHNICAL FIELD OF THE INVENTION

The present invention relates generally to retention mechanisms for depressible buttons. More particularly, the present invention relates to a depressible or switchable button retention mechanism that removably retains a button within a tool.

BACKGROUND OF THE INVENTION

Depressible buttons are used in many types of power tools. Examples of depressible buttons include triggers for initiating operation, reverse mechanisms that reverse the direction of operation of the tool, and power restriction buttons that limit the output of the tool. Each of these buttons must be maintained in a structurally stable configuration due to the repeated use of the buttons during each operation of the tool. A trigger for a drill, for example, may be used many times during a single drilling operation. Also, tools are commonly subjected to large internal stressing and flexing, causing some tool buttons to dislodge or unwantingly pop-out from the tool, if not properly secured.

Conventional tool buttons are typically installed in an intended permanent manner that limits removal of the buttons when replacement, repairing, or removal is required. For example, the tool buttons may be permanently coupled inside the tool or otherwise require complete disassembly of the tool to repair, replace or remove the tool button. Often times, when such buttons are removed, either the tool or the button can be damaged. Alternately, to facilitate future removal of the button, the button may be loosely installed in the tool, or otherwise lack the structural stability needed with a tool button.

Conventional tools include retention mechanisms for retaining buttons, but such retention mechanisms lack the required structural stability or make removing the button difficult. For example, conventional tools include buttons attached to a control interface through slots, cutouts, pins, hooks, or other such measures. These tool buttons permanently attach to internal structure within the tool housing and lack the ability to be removed and replaced with any relative ease.

SUMMARY OF THE INVENTION

Embodiments of the present invention include a button retention mechanism that removably retains a depressible or switchable button within a tool or other device. The mechanism includes a retention member coupled to the button at a first end and removably coupled to a body of the tool or device at a second, opposing end. The retention member can be snap-fit or interference-fit into the body, such that insertion and removal of the button can be carried out without external tools, disassembling the tool components, or destroying the tool or button.

The button retention mechanism is intended for use with a tool or device and includes a housing having a passage defined inside the housing. A depressible or switchable button is operably coupled to the tool or device and includes a button base disposed outside the housing and a button arm extending through the passage into the housing. A retention member is coupled to the button arm and has a maximum retention member dimension defining a maximum width of the retention member, a body disposed inside the housing, and an opening defined within the body and having a maximum opening dimension defining a maximum width of the opening. The maximum opening dimension is smaller than the maximum retention member dimension such that the retention member flexes inwardly, relative to the housing, when being inserted into the opening, and flexes outwardly, relative to the housing, after passing through the opening.

Another embodiment includes a method for assembling a depressible or switchable button into a tool or device including providing a passage in a housing of the tool or device, providing a body inside the tool or device, the body having an opening, at least partially inserting a depressible or switchable button having a button arm and retention member into the passage, and coupling the retention member with the body by inserting the retention member into the opening.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION OF THE EMBODIMENTS

Figure 1:
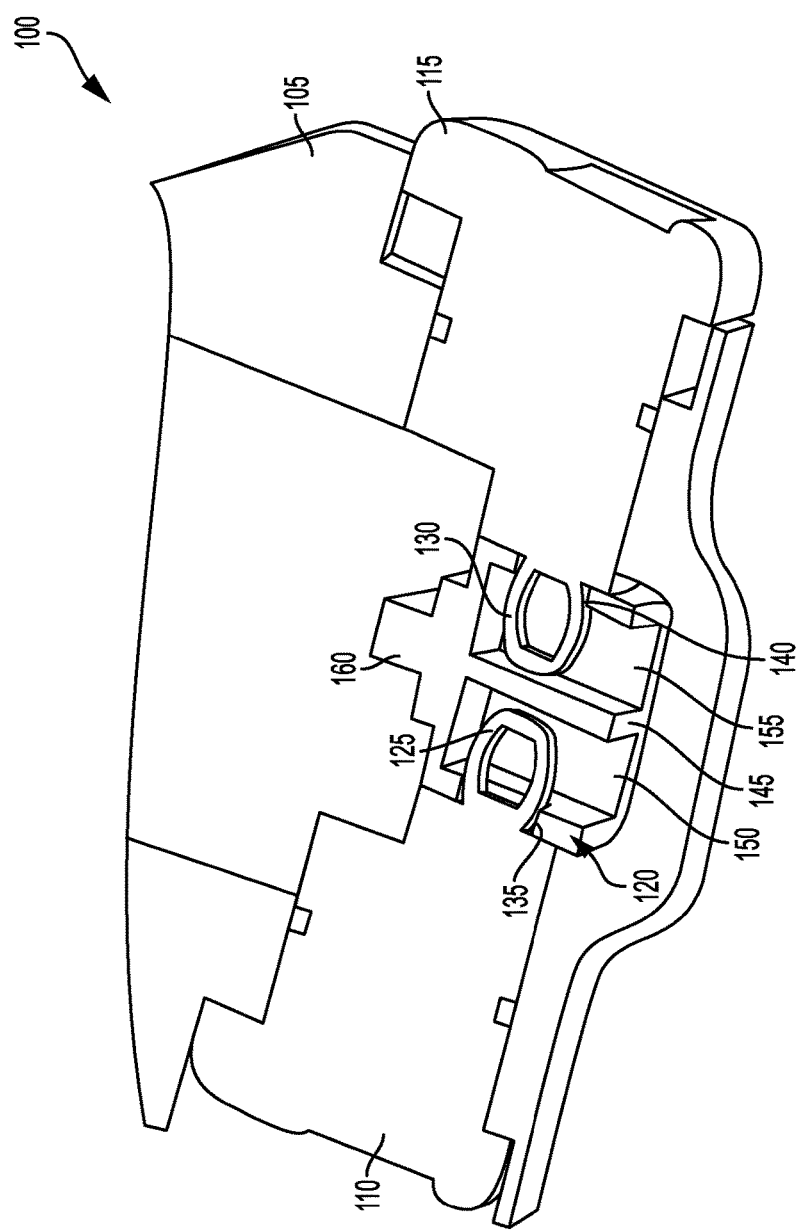
FIG. 1 is a cross section view through the device according to embodiments of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated.

An embodiment of the present invention broadly comprises a button retention mechanism that improves the assembly and disassembly of a depressible or switchable button while providing structural stability for the button to be adequately retained within a device, such as a tool. The mechanism includes a retention member coupled to or integral with the button on a first end and removably coupled to a body at an opposing second end. The retention member can be removably coupled by a snap-fit or interference-fit with the body, allowing easy assembly and removal of the button without requiring disassembly of the tool or device. It will be appreciated that while the present invention is discussed as applicable to a depressible or switchable button for a tool, the invention is equally applicable for any type of device that uses a button.

Figure 2:
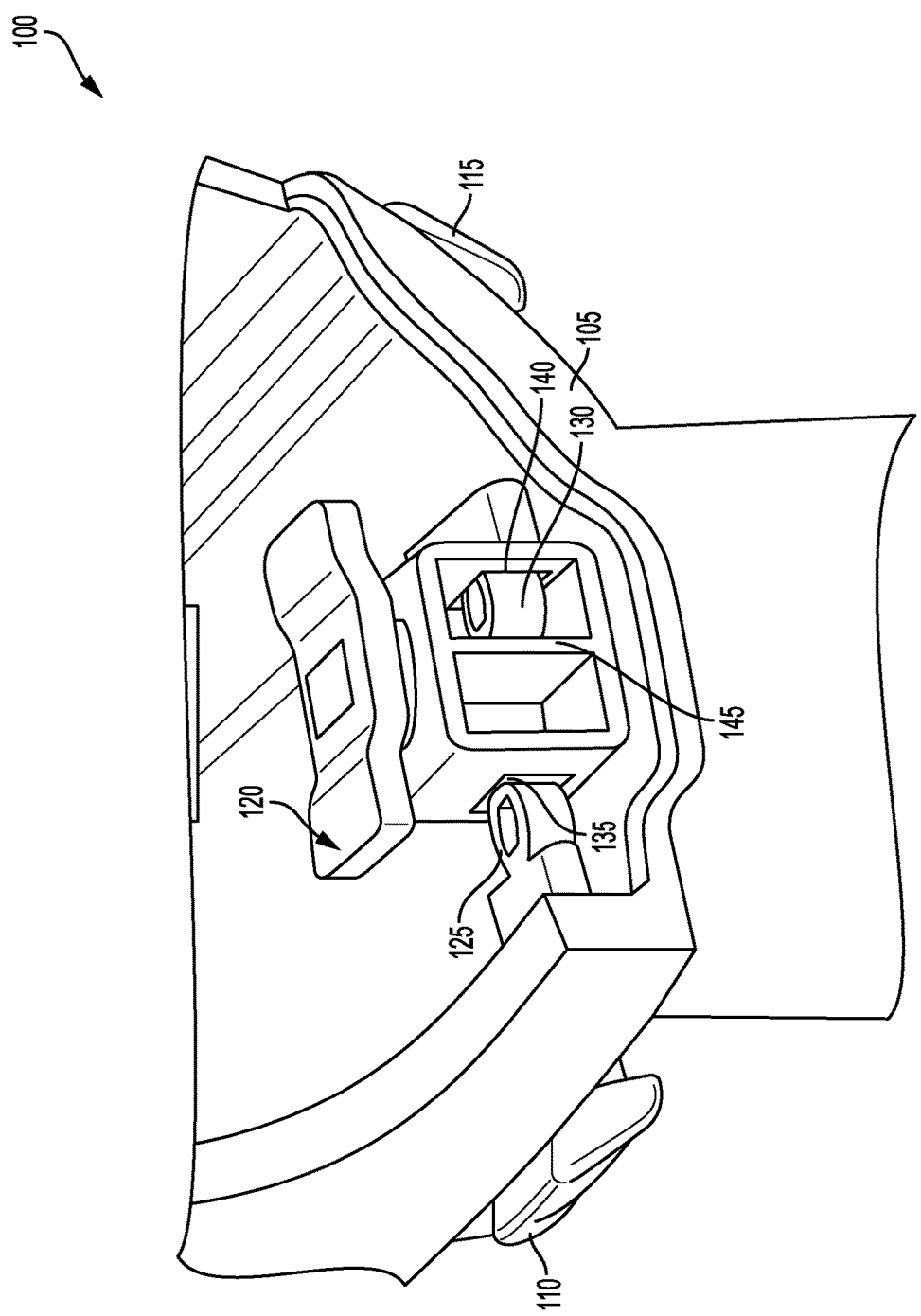
FIG. 2 is a front perspective view of a first button being assembled into a first opening according to embodiments of the present invention.
Figure 3:
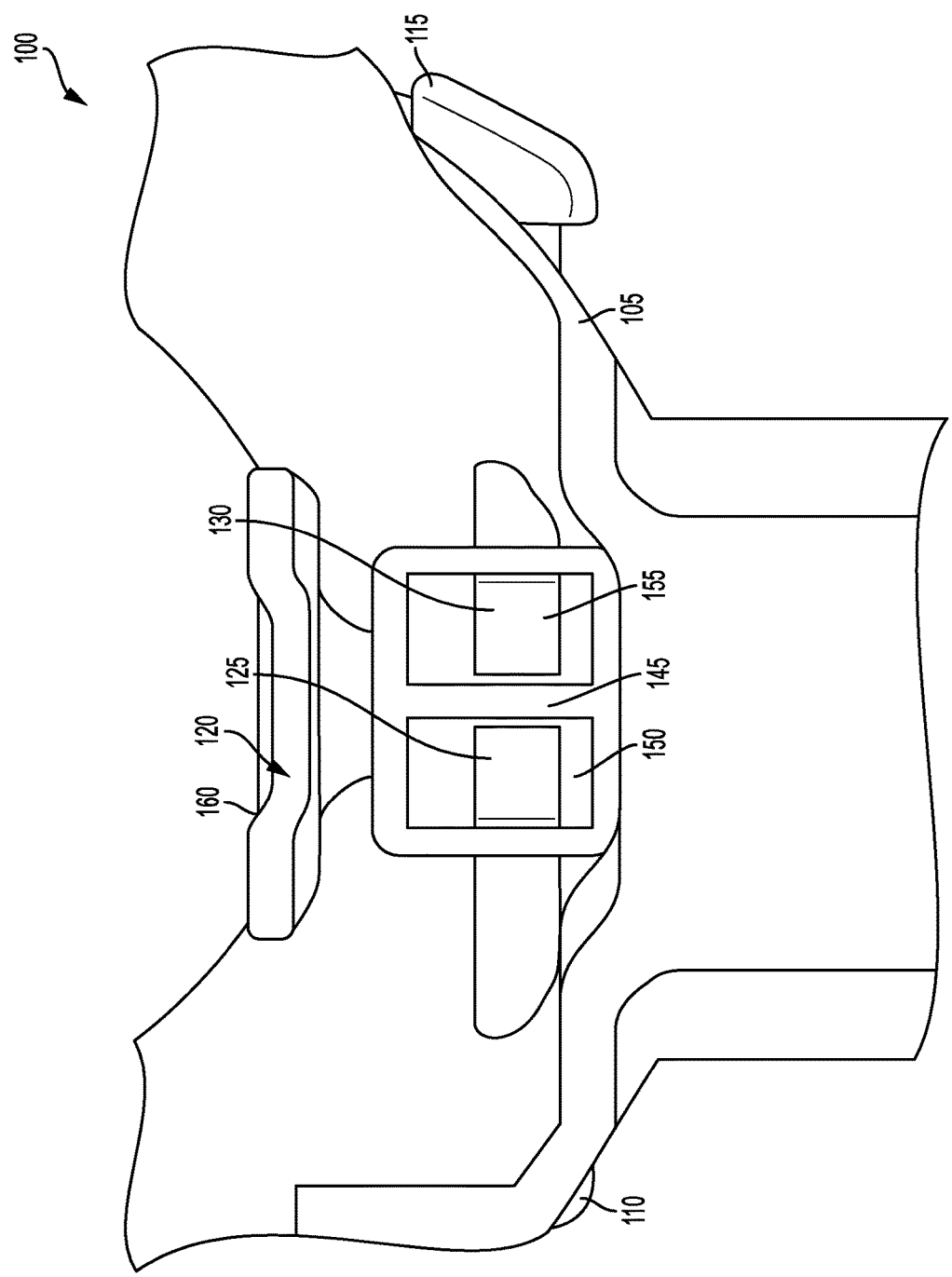
FIG. 3 is a front view of a tool according to embodiments of the present invention.

Referring to FIGS. 1-3, the tool 100 includes a housing 105 adapted to allow a first button 110 and second button 115 to be depressibly coupled to a body 120 within the housing 105. The first and second buttons 110, 115 are operably coupled to the tool in a well-known manner. The first and second buttons 110, 115 can include respective first and second retention members 125, 130 that removably couple to the body 120 through, for example, a snap-fit or interference-fit. The first and second retention members 125, 130 can removably couple with the body 120 by being respectively inserted into first and second body openings 135, 140. The body 120 can further include a divider 145 that separates the body 120 and defines first and second windows 150, 155 facing a direction substantially perpendicular to the direction in which the first and second body openings 135, 140 face. The body 120 can further include an agitator 160 that operably couples the body 120 to the tool, such that when the body 120 is moved, it causes the tool 100 to perform an operation, for example, changing the direction of the tool 100 from forward to reverse.

The first and second buttons 110, 115 can extend through a passage in the housing 105 to be removable from the housing. In some embodiments, the first and second buttons 110, 115 are not permanently coupled within the housing, but respectively include first and second retention members 125, 130 that retain the first and second buttons 110, 115 on the body 120. For example, the first and second retention members 125, 130 can be snap-fit or interference-fit within the openings 135, 140 because a diameter or lateral dimension of the first and second retention members 125, 130 can be respectively larger than the diameter or lateral dimension of the respective first and second openings 135, 140. In other words, the first and second retention members 125, 130 can be respectively larger than the first and second openings 135, 140, requiring additional force to insert or remove the first and second retention member 125, 130 from the first and second openings 135, 140.

The first and second retention members 125, 130 can each be made of a flexible material and/or shaped to allow for flexing when respectively inserted into the first and second openings 135, 140. For example, as shown, the first and second retention members 125, 130 can each be flexible rings (or any other enclosed shape with a gap inside the enclosed shape) that flexes inwardly when respectively inserted into the first and second openings 135, 140, and flex outwardly after being completely respectively inserted through the first and second openings 135, 140. Thereafter, pulling either of the first and second buttons 110, 115 outwardly is substantially prevented by the snap-fit or interference-fit interface between the first and second retention members 125, 130 and the first and second openings 135, 140. The first and second retention members 125, 130 can also each be arcuate segments, rather than a full ring, or any other shape or structure that flexes when respectively inserted through the first and second openings 135, 140. This structure allows the first and second retention members 125, 130 to be inserted into the body 120 and snap-fit or interference-fit in the body 120 without requiring tools and without disassembling the tool 100. Further, the first and second retention member 125, 130 can each be removed with enough force to overcome the ramp forces caused by the snap-fit or interference-fit between the first and second retention members 125, 130 and the first and second openings 135, 140, but not removed during conventional use of the tool 100, which involves less force on the first and second buttons 110, 115. Accordingly, the first and second buttons 110, 115 can each be inserted and removed, and assembled into the tool 100 with structural stability, due to the respective fit interaction between the first and second retention members 125, 130 and the first and second openings 135, 140.

The first and second retention members 125, 130 can be respectively coupled to the body 120 via the first and second openings 135, 140, and can cause the body 120 and agitator 160 to move by actuation of the either of the first and second buttons 110, 115. For example, a user can push the first button 110 inwardly and cause immediate movement of the body 120 and agitator 160 because the first button 110 is coupled to the body 120 via the first retention member 125. Likewise, a user can push the second button 115 inwardly and cause immediate movement of the body 120 and agitator 160 because the second button 115 is coupled to the body 120 via the second retention member 130. Alternately, or in addition to the above, the first and second retention members 125, 130 can abut divider 145 and therefore push the body 120 when either of the first and second buttons 110, 115 is pushed inwardly. Using the example above, pushing the first button 110 inwardly not only pushes the body 120 due to the coupling between the first retention member 125 and first opening 135, but also due to the force exerted on the divider 145 by the first retention member 125. Likewise, pushing the second button 115 inwardly not only pushes the body 120 due to the coupling between the second retention member 130 and second opening 140, but also due to the force exerted on the divider 145 by the second retention member 135. It will be appreciated that by pushing either of the first and second buttons 110, 115 provides an immediate response from the body 120, and by extension, the agitator 160, causing the control operation to be executed immediately after the first or second button 110, 115 actuation.

The agitator 160 can be any shape or size to cause a control operation to occur. For example, the agitator 160 can be coupled to a reverse mechanism such that movement of the agitator 160 in an axial direction will switch the direction the tool 100 operates (e.g., from clockwise to counterclockwise rotational direction). The agitator 160 can be integral with or coupled to the body 120 such that movement of the body 120 causes movement of the agitator 160 and, by extension, causes the control operation to occur.

Figure 4:
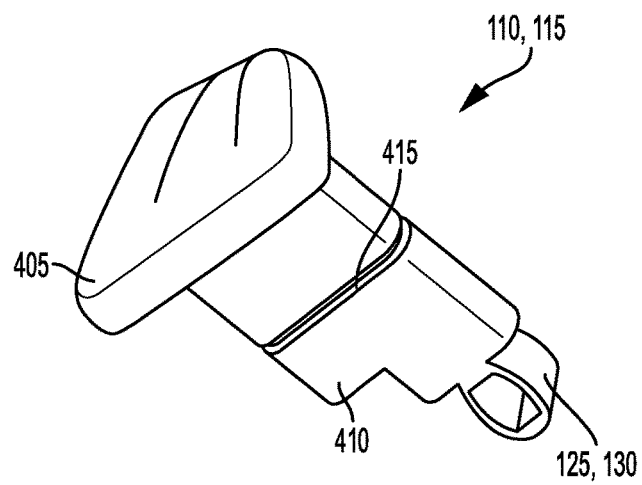
FIG. 4 is a front perspective view of a button according to embodiments of the present invention.
Figure 5:
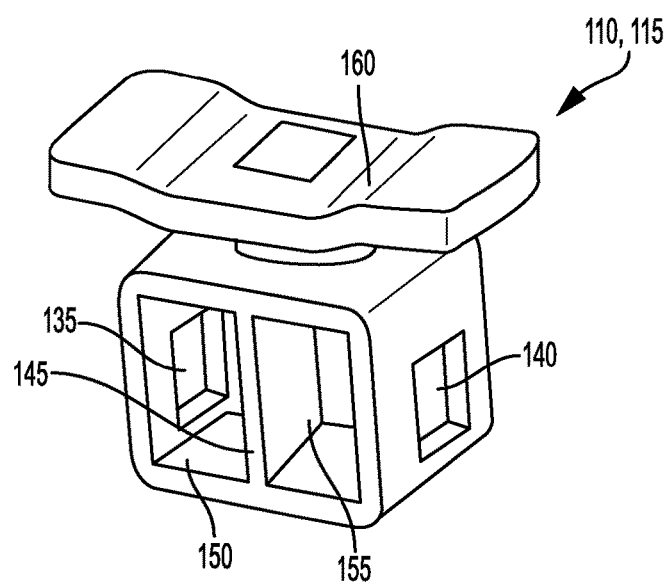
FIG. 5 is a front perspective view of a body according to embodiments of the present invention.

Referring to FIG. 4, the first and second buttons 110, 115 respectively include first and second retention members 125, 130 that couple with the body 120 respectively through first and second openings 135, 140. As shown, the first and second buttons 110, 115 can also each include a button base 405, a button arm 410 extending from the button base 405, and a ridge 415 extending circumferentially around the button arm 410.

The button base 405 can act as an interface between a user and the tool 100 and is the point of physical contact for the user. Because of this, the button base 405 can include a textured surface to tactilely inform the user that the user is touching one of the first and second buttons 110, 115. This allows the user to actuate one of the first and second buttons 110, 115 without having to look at the first and second buttons 110, 115, but rather by feeling for the appropriate button. In some embodiments, the first button 110 has a different textured surface on the button base 405, compared to the surface of the second button 115, to tactilely differentiate for the user which of the first and second buttons 110, 115 is being touched.

The button arm 410 can extend from the button base 405 through a passage of the housing 105 to allow for easy removal, repair, or replacement of either of the first and second buttons 110, 115. Also, the ridge 415 can be disposed circumferentially around each of the first and second buttons 110, 115 at a location longitudinally inwardly from an inner wall of the housing 105 when the button body 405 is substantially flush against an external wall of the housing 105. The ridge 415 can provide a groove for an O-ring or other form of sealant to seal the housing 105 from oil and leakage. Alternately, the ridge 415 need not be implemented at all.

As discussed above, the tool 100 can be a power tool. However, the tool 100 can be any type of tool, such as a hand or power tool. For example, the tool 100 can be an impact wrench, drill, torque wrench, ratchet wrench, hammer, or any other tool. Moreover, the tool 100 need not be a tool at all, but rather any type of a device that includes a depressible button.

As used herein, the term "coupled" and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments of the present invention have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A depressible button device comprising:
    a housing having a passage defined therein;
    a first button having a first button body, a first button base disposed outside the housing, and a first button arm extending through the passage into the housing;
    a first retention member coupled to the first button arm and having a first retention member dimension defining a width of the first retention member, the first retention member is a continuously enclosed structure with a gap located inside the enclosed structure;
    a body disposed inside the housing;
    a first opening defined within the body and having a first opening dimension defining a width of the first opening wherein the first opening dimension is smaller than the first retention member dimension such that the first retention member flexes inwardly when inserted into the first opening, and flexes outwardly after passing through the first opening, and wherein depression of the first button causes movement of the body;
    a second opening defined within the body; and a divider disposed between the first and second openings.

2. The device of claim 1, further comprising an agitator coupled to the body and adapted to cause performance of a control operation upon movement of the body.

3. The device of claim 1 further comprising:
    a second button having a second button body, a second button base disposed outside the housing, and a second button arm extending through a second passage into the housing;
    a second retention member coupled to the second button arm and having a second retention member dimension defining a width of the second retention member; and
    the second opening having a second opening dimension defining a width of the second opening;
    wherein the second opening dimension is smaller than the second retention member dimension such that the second retention member flexes inwardly when inserted into the second opening, and flexes outwardly after passing through the second opening.

4. The device of claim 3, wherein the divider separates the first retention member from the second retention member, wherein depression of either one of the first and second buttons causes movement of the body.

5. The device of claim 1, further comprising a groove circumferentially disposed around the first button arm.

6. The device of claim 5, wherein the groove is disposed on the first button arm such that when the first button body is substantially flush with an external wall of the housing, and wherein the groove is disposed inside the housing.

7. The device of claim 3, wherein the first button body includes a first textured surface.

8. The device of claim 7, wherein the second button body includes a second textured surface different than the first textured surface.

9. The device of claim 1, wherein the first button is either snap-fit or interference-fit in the first opening.

10. The device of claim 1, wherein the continuously enclosed structure is a ring.

11. A method for retaining a depressible button in a device, comprising:
    providing a passage in a housing of the device;
    providing a body inside the device, the body having first and second openings and a divider disposed between the first and second openings;
    at least partially inserting the button, which includes a button arm and retention member, into the passage, wherein the retention member is a continuously enclosed structure with a gap located inside the enclosed structure; and
    coupling the retention member with the body by inserting the retention member into the first opening, wherein the retention member flexes inwardly when inserted into the first opening, and wherein depression of the button causes movement of the body.

12. The method of claim 11, wherein the step of coupling the retention member with the body includes pressing the retention member against the first opening, overcoming ramp forces of the retention member and the first opening, and continuing to press the retention member into the first opening until the retention member is snap fit or interference fit into the first opening.

13. The method of claim 11, wherein the step of coupling the retention member with the body includes either snap-fitting or interference-fitting the button in the first opening.

* * * * *